(12) United States Patent
Zosel et al.

(10) Patent No.: US 11,729,437 B1
(45) Date of Patent: Aug. 15, 2023

(54) SYSTEMS AND METHODS FOR CONTENT DISTRIBUTION BETWEEN CONTENT BREAKS

(71) Applicant: WideOrbit LLC, San Francisco, CA (US)

(72) Inventors: Trevan Zosel, Bothell, WA (US); Brian Edward Thoman, Everett, WA (US); Francisco Lopez Alvarez, Woodinville, WA (US); William E. Offeman, Redmond, WA (US)

(73) Assignee: WIDEORBIT LLC, San Francisco, CA (US)

( * ) Notice: Subject to any disclaimer, the term of this patent is extended or adjusted under 35 U.S.C. 154(b) by 0 days.

(21) Appl. No.: 17/716,917

(22) Filed: Apr. 8, 2022

(51) Int. Cl.
*H04N 21/234* (2011.01)
*H04H 60/37* (2008.01)
*H04N 21/81* (2011.01)

(52) U.S. Cl.
CPC .... *H04N 21/23424* (2013.01); *H04H 60/375* (2013.01); *H04N 21/812* (2013.01)

(58) Field of Classification Search
CPC ................................................ H04N 21/23424
See application file for complete search history.

(56) References Cited

U.S. PATENT DOCUMENTS

| 6,993,245 B1 * | 1/2006 | Harville | H04N 5/76 |
| | | | 386/E5.001 |
| 2009/0254420 A1 * | 10/2009 | Curd | G06Q 30/0242 |
| | | | 705/7.29 |

* cited by examiner

*Primary Examiner* — Michael H Hong
(74) *Attorney, Agent, or Firm* — Seed IP Law Group, LLP

(57) ABSTRACT

Systems, methods, and articles for optimizing the placement of content, such as advertisements, within content breaks. The systems disclosed herein automatically identify the optimal allocation of content within breaks included in advertisement placement opportunities. This is achieved by scoring placed advertisements and determining whether a prospective advertisement can be placed within a break. The system may score the placed advertisements based on rules provided by a media content provider and multiple buyers.

22 Claims, 14 Drawing Sheets

| | | Placed Units 901 | | | |
|---|---|---|---|---|---|
| | | Advertiser | Product Code | | |
| | | McDowells | Fast Food | | |

| | | | Placed Units | Advertisement Scores | | | Break Score |
|---|---|---|---|---|---|---|---|
| | | Advertiser | Product Code | 1st | 2nd | 3rd | |
| Break 1 | 1 | Jax's Pizza | Pizza | | 1 | n/a | 3 |
| | 2 | Joe's Drive-in | Fast Food | 1 | 1 | n/a | |
| | 3 | | | | | | |
| | L | | | | | | |
| Break 2 | 1 | Grandpa's Pizza | Pizza | | 1 | n/a | 2 |
| | 2 | Bob's Seafood | Casual Dining | | 1 | n/a | |
| | 3 | | | | | | |
| | L | | | | | | |
| Break 3 | 1 | Mario's | Casual Dining | | 1 | n/a | 1 |
| | 2 | McDowells | Fast Food | | | | |
| | 3 | | | | | | |
| | L | | | | | | |

*Fig. 9*

| Advertiser | Product Code |
|---|---|
| Bear-Hand Wine | Wine |

1001

| | | Placed Units | | Advertisement Scores | | | | Break Score |
|---|---|---|---|---|---|---|---|---|
| | | Advertiser | Product Code | 1st | 2nd | 3rd | 4th | |
| Break 1 | 1 | Vinny Vineyard | Wine | 1 | 1 | 1 | n/a | 3 |
| | 2 | | | | | | | |
| | 3 | | | | | | | |
| | L | | | | | | | |
| Break 2 | 1 | Beast Energy | Energy Drink | | | 1 | n/a | 3 |
| | 2 | Frooty Punch | Juice/Tea | | | 1 | n/a | |
| | 3 | Pop's Cola | Soda | | | 1 | n/a | |
| | L | | | | | | | |
| Break 3 | 1 | Spring's Water | Water | | | 1 | n/a | 2 |
| | 2 | English Tea | Hot Drink | | | 1 | n/a | |
| | 3 | | | | | | | |
| | L | *Bear-Hand Wine* | *Wine* | | | | | |

*Fig. 10*

| | | Advertiser | Product Code |
|---|---|---|---|
| | | Paul Revere's | Domestic Beer |

| | | Placed Units | | Advertisement Scores | | | | Break Score |
|---|---|---|---|---|---|---|---|---|
| | | Advertiser | Product Code | 1st | 2nd | 3rd | 4th | |
| Break 1 | 1 | Mountain Ale | Domestic Beer | 1 | 1 | 1 | n/a | 3 |
| | 2 | | | | | | | |
| | 3 | | | | | | | |
| | L | | | | | | | |
| Break 2 | 1 | Beast Energy | Energy Drink | | | 1 | n/a | 2 |
| | 2 | Frooty Punch | Juice/Tea | | 1 | 1 | n/a | |
| | 3 | | | | | | | |
| | L | *Paul Revere's* | *Domestic Beer* | | | | | |
| Break 3 | 1 | Bear-Hand Wine | Wine | | 1 | 1 | n/a | 2 |
| | 2 | | | | | | | |
| | 3 | | | | | | | |
| | L | *Paul-Revere's* | *Domestic Beer* | | | | | |

*Fig. 11*

| Advertiser | Product Code |
|---|---|
| Ultra Towels | Paper Towels |

| | | Placed Units | | Advertisement Scores | | | | Break Score |
|---|---|---|---|---|---|---|---|---|
| | | Advertiser | Product Code | 1st | 2nd | 3rd | 4th | |
| Break 1 | 1 | Facial Tissues | Tissues | | 1 | n/a | n/a | |
| | 2 | Sweepers | Dusters | | | n/a | n/a | |
| | 3 | Waterfall | Dish Detergent | | | n/a | | |
| | L | Ultra Towels | Paper Towels | | 1 | | | 1 |
| Break 2 | 1 | TP Ultra | Toilet Paper | | | n/a | n/a | |
| | 2 | Grove | Air Fresheners | | | n/a | n/a | |
| | 3 | | | | | | | |
| | L | Ultra Towels | Paper Towels | | 1 | | | 1 |
| Break 3 | 1 | Angel Paper | Toilet Paper | | 1 | n/a | n/a | |
| | 2 | Facial Tissues | Tissues | | 1 | n/a | n/a | |
| | 3 | Scrubbers | Sponges | | | | n/a | |
| | L | | | | | | | 2 |

*Fig. 12*

|  | Advertiser | Product Code |
|---|---|---|
|  | Home Retailer | Hardware/Lumber |

1301

Table 1300:

| | | Placed Units | | Advertisement Scores | | | | Break Score |
|---|---|---|---|---|---|---|---|---|
| | | Advertiser | Product Code | 1st | 2nd | 3rd | 4th | |
| Break 1 | 1 | Wally's Garden | Lawn/Garden | | n/a | n/a | n/a | 2 |
| | 2 | Hughes | Hardware/Lumber | 1 | n/a | n/a | n/a | |
| | 3 | Clothier's | Women's Apparel | | | 1 | n/a | |
| | L | *Ultra Towels* | *Paper Towels* | | | | | |
| Break 2 | 1 | Duke's | Appliances | | n/a | n/a | n/a | 1 |
| | 2 | Amy's Furniture | Furniture | | n/a | n/a | n/a | |
| | 3 | Baby Shoppe | Children's Clothes | | | 1 | n/a | |
| | L | *Home Retailer* | *Hardware/Lumber* | | | | | |
| Break 3 | 1 | Brace Hardware | Hardware/Lumber | 1 | n/a | n/a | n/a | 2 |
| | 2 | Guy's Warehouse | Men's Apparel | | | 1 | n/a | |
| | 3 | | | | | | | |
| | L | | | | | | | |

1310 1311 1312 1313 1314 1315 1316 1317 1318

1320 (Break 1), 1321 (Break 2), 1322 (Break 3)

| Advertiser | Product Code |
|---|---|
| Coola | Soda; Energy Drinks |

1400:

| | | Placed Units | | Advertisement Scores | | | | | | Break Score |
|---|---|---|---|---|---|---|---|---|---|---|
| | | Advertiser | Product Code | 1st | 2nd | 3rd | 1st | 2nd | 3rd | |
| Break 1 | 1 | Mountain Ale | Domestic Beer | 1 | | | | | | 12 |
| | 2 | Bespi | Soda | | 1 | 1 | | 1 | 1 | |
| | 3 | | Energy Drinks | | 1 | 1 | | | 1 | |
| | L | | | | | | | | | |
| Break 2 | 1 | Beast Energy | Energy Drinks | | 1 | 1 | 1 | 1 | 1 | 9 |
| | 2 | Frooty Punch | Juice/Tea | | 1 | 1 | 1 | 1 | 1 | |
| | 3 | | | | | | | | | |
| | L | | | | | | | | | |
| Break 3 | 1 | Bear-Hand Wine | Wine | | | 1 | | | 1 | 2 |
| | 2 | *Coola* | *Soda; Energy Drinks* | | | | | | | |
| | 3 | | | | | | | | | |
| | L | | | | | | | | | |

*Fig. 14*

SYSTEMS AND METHODS FOR CONTENT DISTRIBUTION BETWEEN CONTENT BREAKS

BACKGROUND

Technical Field

The present disclosure relates the field of computer technology, and more particularly, to computer systems and methods that facilitate the delivery of content to consumers.

Description of the Related Art

Content providers such as radio stations and networks, television stations and networks, and Webcasters provide programming including content which is the subject of programming. Content providers' delivery of content is often via broadcasts or Webcasts (collectively, "mediacasts"). While content providers may employ repeaters and the like, broadcasts are typically limited in range to a geographic region.

Programming often includes advertisements interspersed with the subject matter of the programming. The advertisements may occur in segments or slots sometimes referred to as "ad breaks." Content providers typically sell advertising time to generate revenue to fund operation, as well as generate profits, where the content provider is a commercial entity rather than a nonprofit entity. Advertisers typically offer to buy this advertising time to advertise their products or services. For example, Advertiser A may offer Content Provider B $1000 to buy advertisement time played during Television Show C. Advertisers may also specify rules or guidelines related to when an advertisement should be aired within an advertisement placement opportunity, in which breaks the advertisement should be aired, etc. For example, Advertiser A may specify that their advertisement is not to be shown during the same break as Advertiser D's advertisements.

New approaches that automate, streamline, and reduce the complexity of the various activities related to buying, selling and placement of new materials, for instance, advertisements, in mediacasts are desirable.

BRIEF SUMMARY

A method of operating a computer system to place advertisements within breaks may be summarized as including receiving a plurality of advertisements assigned to an advertisement placement opportunity, each advertisement including advertisement information; receiving a plurality of breaks for the advertisement placement opportunity, each break including a plurality of spots; and for each respective advertisement of the plurality of advertisements assigned to the advertisement placement opportunity: determining a break score for each break, comprising: identifying advertisements assigned to spots included in the break; assigning an advertisement score to each of the identified advertisements based on the advertisement information for the respective advertisement and the advertisement information for the each of the identified advertisements; and determining the break score based on the assigned advertisement scores for each of the identified advertisements; determining which break of the plurality of breaks the respective advertisement should be assigned to based on the determined break scores; and assigning the respective advertisement to one spot of the plurality of spots included in the determined break.

The advertisement information may include at least one product code for the advertisement.

Assigning the advertisement score to the identified advertisement may include assigning the advertisement score by using the product code in the advertisement information for the respective advertisement and the product code in the advertisement information for the identified advertisement.

Determining the break score may include accessing a tree data structure which includes at least one product code at each node; and assigning the advertisement score to the identified advertisement based on the tree data structure, the advertisement information for the respective advertisement, and the advertisement information for the identified advertisement.

Determining the break score may further include receiving user input specifying at least one product code to include in the tree data structure.

Determining which break the respective advertisement should be assigned to may include receiving separation information indicating a maximum number of advertisements with a certain product code that are permitted to be assigned to each break; and determining which break the respective advertisement should be assigned to based on the determined break scores and the separation information.

The separation information may be included in a tree data structure which includes at least one product code at each node, and assigning the advertisement score may further comprise: assigning the advertisement score to the identified advertisement based on the tree data structure, the advertisement information for the respective advertisement, and the advertisement information for the identified advertisement.

Assigning the advertisement score may further comprise: recursively navigating through the tree data structure to determine a level of similarity between the respective advertisement and the identified advertisement.

Determining which break the respective advertisement should be assigned to may include determining whether two or more breaks of the plurality of breaks have the same break score; and responsive to determining that two or more breaks have the same break score, determining which of the two or more breaks the respective advertisement should be assigned to based on a vertical distribution of the spots included in the two or more breaks.

Determining which break the respective advertisement should be assigned to may include determining whether a plurality of breaks have the same break score; and determining which break the respective advertisement should be assigned to based on a priority assigned to each spot included in the plurality of breaks.

Determining which break the respective advertisement should be assigned to may include determining whether a plurality of breaks have the same break score; and determining which break the respective advertisement should be assigned to by randomly selecting one break of the plurality of breaks.

Determining which break the respective advertisement should be assigned to may further comprise: determining whether a plurality of breaks have the same break score; determining whether the respective advertisement can be assigned to a break based on a vertical distribution; based on a determination that the respective advertisement can be assigned to a break based on a vertical distribution, assigning the respective advertisement to a break based on a vertical distribution; based on a determination that the respective advertisement cannot be assigned to a break based on a vertical distribution, determining whether the respective advertisement can be assigned to a break based on a priority assigned to each slot included in the plurality of breaks; based on a determination that the respective advertisement can be assigned to a break based on a priority assigned to each slot included in the plurality of breaks, assigning the respective advertisement to a break based on a priority assigned to each slot included in the plurality of breaks; and based on a determination that the respective advertisement cannot be assigned to a break based on a priority assigned to each slot included in the plurality of breaks, assigning the respective advertisement to a random break of the plurality of breaks.

A system to optimize the placement of advertisement spots may include at least one nontransitory processor-readable storage medium that stores at least one of instructions or data; and at least one processor communicatively coupled to the at least one nontransitory processor-readable storage medium, wherein the instructions or data cause the at least one processor to: receive a plurality of advertisements assigned to an advertisement placement opportunity, each advertisement including advertisement information; receive a plurality of breaks for the advertisement placement opportunity, each break including a plurality of spots; and for each respective advertisement of the plurality of advertisements assigned to the advertisement placement opportunity: determine a break score for each break, comprising: identify advertisements assigned to spots included in the break; assign an advertisement score to each of the identified advertisements based on the advertisement information for the respective advertisement and the advertisement information for the each of the identified advertisements; and determine the break score based on the assigned advertisement scores for each of the identified advertisements; determine which break of the plurality of breaks the respective advertisement should be assigned to based on the determined break scores; and assign the respective advertisement to one spot of the plurality of spots included in the determined break.

In the system to optimize the placement of advertisement spots the advertisement information may include at least one product code for the advertisement.

In the system to optimize the placement of advertisement spots, causing the at least one processor to assign the advertisement score to the identified advertisement may include causing the at least one processor to assign the advertisement score based on the product code in the advertisement information for the respective advertisement and the product code in the advertisement information for the identified advertisement.

In the system to optimize the placement of advertisement spots, causing the at least one processor to determine the break score may include causing the at least one processor to: access a tree data structure which includes at least one product code at each node; and assign the advertisement score to the identified advertisement based on the tree data structure, the advertisement information for the respective advertisement, and the advertisement information for the identified advertisement.

In the system to optimize the placement of advertisement spots, the at least one processor may be further caused to: receive user input specifying at least one product code to include in the tree data structure.

In the system to optimize the placement of advertisement spots, causing the at least one processor to determine which break the respective advertisement should be assigned to may include causing the at least one processor to: receive separation information indicating a maximum number of advertisements with a certain product code that are permitted to be assigned to each break; and determine which break the respective advertisement should be assigned to based on the determined break scores and the separation information.

In the system to optimize the placement of advertisement spots, causing the at least one processor to determine which break the respective advertisement should be assigned to may include causing the at least one processor to: determine whether two or more breaks of the plurality of breaks have the same break score; and responsive to determining that two or more breaks have the same break score, determine which of the two or more breaks the respective advertisement should be assigned to based on a vertical distribution of the spots included in the two or more breaks.

In the system to optimize the placement of advertisement spots, causing the at least one processor to determine which break the respective advertisement should be assigned to may include causing the at least one processor to: determine whether a plurality of breaks have the same break score; and determine which break the respective advertisement should be assigned to based on a priority assigned to each spot included in the plurality of breaks.

In the system to optimize the placement of advertisement spots, causing the at least one processor to determine which break the respective advertisement should be assigned to may include causing the at least one processor to: determine whether a plurality of breaks have the same break score; and determine which break the respective advertisement should be assigned to by randomly selecting one break of the plurality of breaks.

A nontransitory processor-readable storage medium may store at least one of instructions or data, the instructions or data, when executed by at least one processor, may cause the at least one processor to: receive a plurality of advertisements assigned to an advertisement placement opportunity, each advertisement including advertisement information; receive a plurality of breaks for the advertisement placement opportunity, each break including a plurality of spots; and for each respective advertisement of the plurality of advertisements assigned to the advertisement placement opportunity: determine a break score for each break, comprising: identify advertisements assigned to spots included in the break; assign an advertisement score to each of the identified advertisements based on the advertisement information for the respective advertisement and the advertisement information for the each of the identified advertisements; and determine the break score based on the assigned advertisement scores for each of the identified advertisements; determine which break of the plurality of breaks the respective advertisement should be assigned to based on the determined break scores; and assign the respective advertisement to one spot of the plurality of spots included in the determined break.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 9 is a display diagram depicting an example advertisement distribution table used to illustrate the how the content distribution engine places an advertisement within an advertisement placement opportunity, according to various embodiments described herein.

FIG. 10 is a display diagram depicting an advertisement distribution table, used to illustrate the how the content distribution engine places an advertisement within an advertisement placement opportunity, according to various embodiments described herein.

FIG. 11 is a display diagram depicting an advertisement distribution table, used to illustrate the how the content distribution engine places an advertisement within an advertisement placement opportunity, according to various embodiments described herein.

FIG. 12 is a display diagram depicting an advertisement distribution table, used to illustrate the how the content distribution engine places an advertisement within an advertisement placement opportunity, according to various embodiments described herein.

FIG. 13 is a display diagram depicting an advertisement distribution table, used to illustrate the how the content distribution engine places an advertisement within an advertisement placement opportunity, according to various embodiments described herein.

FIG. 14 is a display diagram depicting an advertisement distribution table, used to illustrate the how the content distribution engine places an advertisement with multiple product codes within an advertisement placement opportunity, according to various embodiments described herein.

DETAILED DESCRIPTION

Figure 1A:
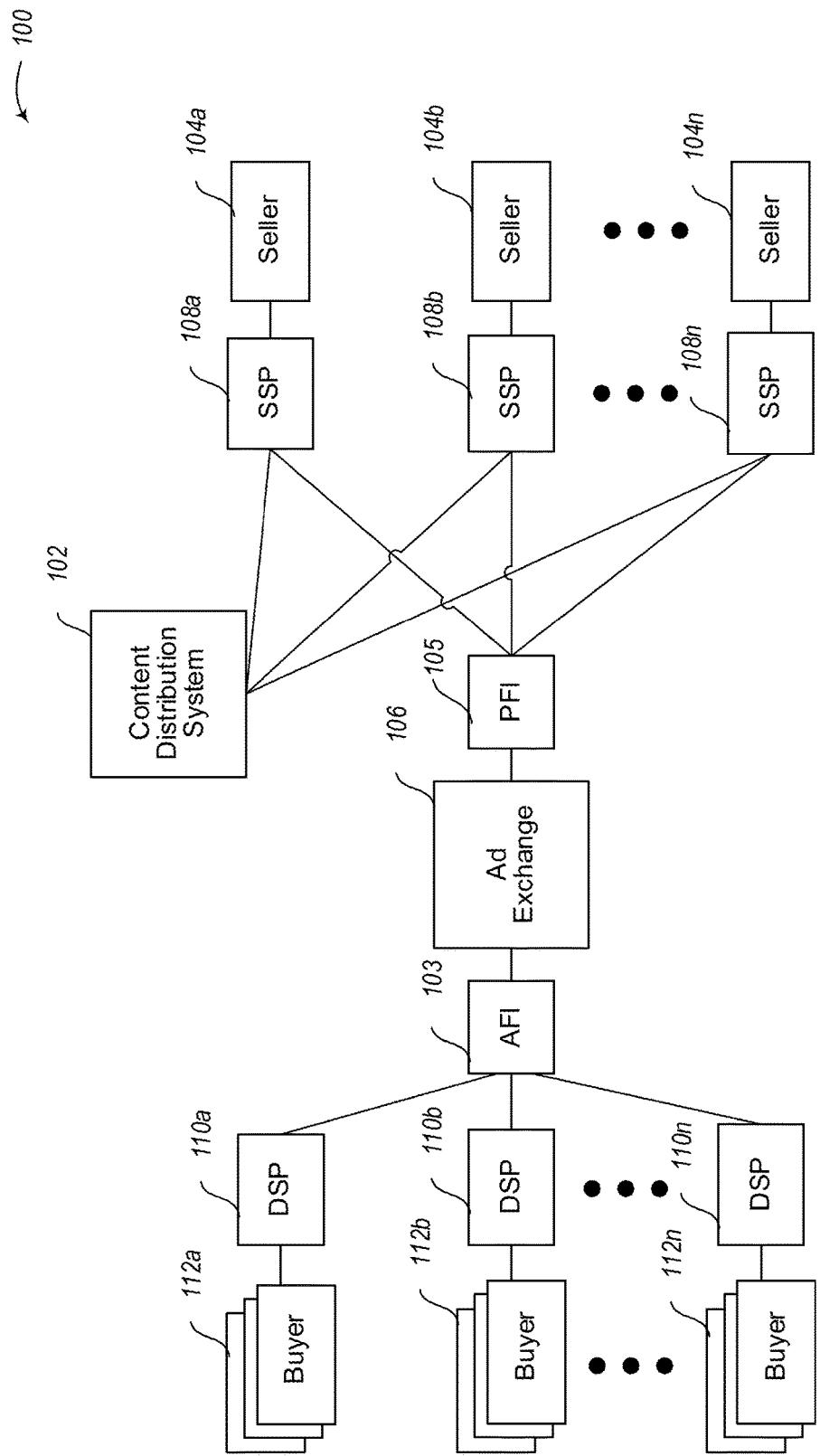
FIG. 1a shows an example networked environment according to one illustrated implementation in which various apparatus, methods and articles described herein may operate.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to computer-implemented systems and methods of automating and optimizing the placement of advertisements within a break. Buying and selling television, radio or digital advertising has traditionally been a highly manual process and requires many participants to execute orders. Layering in audience and pricing data adds another level of complexity to the campaign execution workflow. Furthermore, determining the placement of advertisements within a break adds yet another level of complexity.

In conventional workflows, an advertiser, or "buyer," contacts multiple networks, or "media content providers," to negotiate and purchase "advertisement placement opportunities." The advertisement placement opportunities include one or more breaks, each of which include one or more spots, within media content. For example, the advertisement placement opportunity may represent an opportunity to air the advertisement during a television show, and each break may represent a commercial break within the television show. Once the buyer has purchased the advertisement placement opportunity, the media content provider assigns content provided by the buyer to a break included in the advertisement placement opportunity. The buyer may negotiate a price with each of these providers, only to find out later on that the buyer would have to share the break with one of their competitors, resulting in wasted time, effort, and, in the case of negotiations and purchases that use computer systems or automation, computer resources.

An advertisement is "cleared" when a buyer's offer to buy an advertisement placement opportunity is accepted by a seller, or media content provider, and the buyer's advertisement is published in the advertisement placement opportunity. However, the advertisement placement opportunity may include multiple ad breaks within which advertisements from multiple buyers will be placed. Additionally, each buyer and seller may have rules for which advertisements can be included in the break that their advertisement is ultimately placed in. Thus, an advertisement may be assigned to a break, but it may not be able to appear in each break included in advertisement placement opportunity.

As a result, a seller must manually assign advertisements to each break, a process which requires a significant amount of resources, including computer resources, to ensure that the advertisement is properly assigned to a break. Additionally, when the seller makes a mistake in assigning the advertisements to each break, additional resources must be used to fix the mistake and re-assign the advertisements, including any resources spent in preparing the advertisement to air during the break.

Implementations of the present disclosure are directed to computer-implemented systems and methods for placement of content, such as advertisements, within content-breaks in accordance with guidelines set by a buyer or seller. Thus, the aforementioned inefficient and unreliable processes is improved to provide optimization that was previously not possible using conventional workflows.

Such implementations are thus able to improve the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by automating the assignment of the advertisements to breaks, computing resources are preserved by eliminating user interfaces which are used to manually assign and check the assignment of the advertisement to the break. Furthermore, fewer computing resources are wasted on correcting mistakes which result in a re-assignment of advertisements.

In at least some implementations, buyers and sellers can trade mediacast (e.g., broadcast, Webcast) advertisement inventory (e.g., direct or programmatically) at local, national, and/or worldwide levels. The types of media traded via may simultaneously include numerous types of media, including TV, cable, satellite, radio, outdoor, display, digital, print, etc. Such programmatic advertising implements data-driven automation of audience-based advertising operations which inverts the industry standard in which marketers rely on show ratings to determine desirable audiences for the marketers' advertisements.

In at least some implementations, the content distribution systems disclosed herein interface with demand side platforms (DSPs) that optimize offers to guarantee that an advertisement will clear. Sellers enjoy seamless transaction workflow for getting advertisements from proposal, to publishing, and to billing that delivers a significant reduction in time spent on reconciliation and "make-goods" and streamlines processes for creative management and revenue management across direct and programmatic sales channels.

The content distribution systems may include a seller side platform (SSP) or console for sellers (e.g., broadcasters, Webcasters, printed content providers) and an advertiser-facing interface or console for demand side platform (DSP) entities to interface with the advertisement purchase systems. Through the SSP, sellers can access demand and make advertisement inventory available and accept or reject bid responses based on marketplace demand.

The advertiser-facing interface facilitates creative placement and reviewing for the buy side, and may have transcoding and approval tools for the sell side. For example, in some implementations, once an advertisement transaction is approved, the advertiser-facing interface sends the advertisement directly to a broadcaster's traffic system. In some implementations, the advertiser-facing interface facilitates the creation of rules, guidelines, preferences, etc., used to place the advertiser's content within a break.

In some implementations, the content distribution systems disclosed herein automate aspects of billing, reconciliation, and creative execution. In some implementations, the content distribution systems may be integrated with advertisement management software and sales and traffic management systems.

FIG. 1a shows an example networked environment 100 according to one illustrated implementation in which various apparatus, methods and articles described herein may operate. The environment 100 includes a content distribution system 102 an advertiser-facing interface (AFI) 103, a media content provider-facing interface (PFI), a number of sellers or content providers 104A-104N (collectively 104), a number of seller side platforms (SSPs) 108A-108N (collectively 108), an ad server 106, also referred to herein as an ad exchange or ad exchange server, a number of demand side platforms (DSPs) 110A-110N (collectively 110), and a number of buyers 112A-112N (collectively 112), such as advertisers or agencies, all communicatively coupled by one or more networks or other communications channels. The various components of the environment may be distributed or integrated in any number of ways. For example, in at least some implementations, two or more of the DSPs 110, AFI 103, content distribution system 102, and PFI 105 may be integrated into a single platform provided by one or more entities.

The sellers 104 may take a variety of forms, for example, radio stations or broadcasters, television stations or broadcasters, other terrestrial or satellite broadcasters or multicasters (not shown), Webcasters, printed content (e.g., print media) providers, outdoor content (e.g., billboards) providers, etc. The sellers 104 may, or may not, own the content that they provide. The sellers 104 utilize the PFI 105 to access the content distribution system 102. On the buy side, the buyers 112 (e.g., advertisers, agencies) may interface with the system 102 via the AFI 103 through the buyers' respective DSPs 110.

With presently available systems, it is difficult for advertisers to ensure that their advertisements are placed within breaks that do not include advertisements for their competitors. Further, although sellers have the final say in which breaks the advertisement appears, they may wish to increase the diversity of advertisements within the breaks, such as by ensuring that the advertisements of many different types of buyers are aired within the break. Additionally, a seller must analyze many different combinations of assignments of advertisements to breaks in order to reach the optimal placement of advertisements within an advertisement placement opportunity, such that each of the buyers' guidelines are followed and that there is a diversity in the types of buyers whose advertisements are aired within the break.

To address these and other issues, one or more implementations of the present disclosure assign scores to advertisements and breaks in order to determine a break to which an advertisement should be assigned.

In an example implementation, a buyer 112a may negotiate with a seller 104a to place an advertisement within an advertisement placement opportunity defined by the seller 104a. The advertisement placement opportunity may include a plurality of breaks within which an advertisement may be placed. The seller 104a also negotiates with other buyers, to place an advertisement within the same advertisement placement opportunity. The content distribution system 102 places the advertisements within the breaks included in the advertisement placement opportunity.

Each buyer 112a-112n may additionally provide the seller with one or more rules or guidelines for placing the advertisements within the breaks. The content distribution system 102 places the advertisements included in the advertisement placement opportunity based on the rules provided by each of the buyers. Furthermore, the content distribution system 102 may place the advertisements included in the breaks based on internal rules or guidelines that the content distribution system uses to determine whether an advertisement can be placed with other advertisements in the same break.

Furthermore, as the number of buyers increases, the complexity of determining a placement for an advertisement within an advertisement placement opportunity increases exponentially, such that it becomes impossible for a human to find the optimal placement of advertisements within the advertisement placement opportunity while following the internal guidelines or rules and the guidelines and rules for each buyer.

The ad server 106 may be used to facilitate the negotiation between a buyer 112 and seller 104 to place an advertisement in an advertisement placement opportunity. The ad server 106 may include an automated auction, an automated advertisement placement system, or other systems or methods for assisting buyers and sellers in the sale of advertisement placement opportunity. The ad server 106 may provide data regarding the sale of advertisement placement opportunities, advertisements provided by buyers, or other data used by the content distribution engine 102, to the content distribution engine 102. In some embodiments, the ad server 106 may receive some or all of the data regarding content distribution rules, and may pass those rules to the content distribution system 102.

Figure 1B:
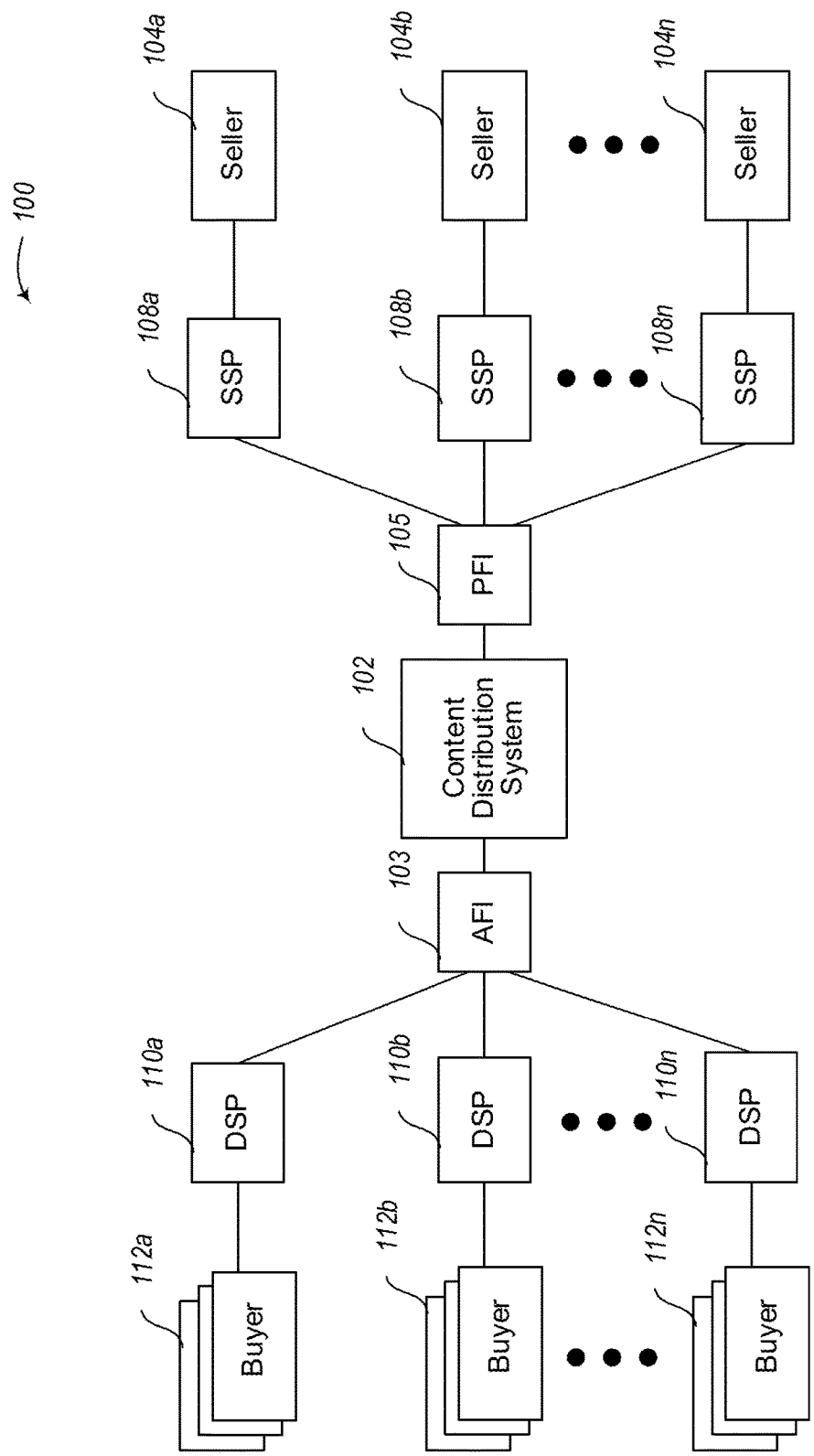
FIG. 1b shows a second example networked environment according to one illustrated implementation in which various apparatus, methods and articles described herein may operate.

FIG. 1b shows a second example networked environment according to one illustrated implementation in which various apparatus, methods and articles described herein may operate. In FIG. 1b the content distribution system 102 is able to communicate with both the buyers 112 through the AFI 103 and the sellers 104 through the PFI 105. In some embodiments, the content distribution system 102 of FIG. 1b is able to perform some or all of the functions of the ad server 106. In some embodiments, the content distribution system 102 is included as part of the ad server 106, and is able to access or provide some or all of the functionality provided by the ad server 106.

Figure 2:
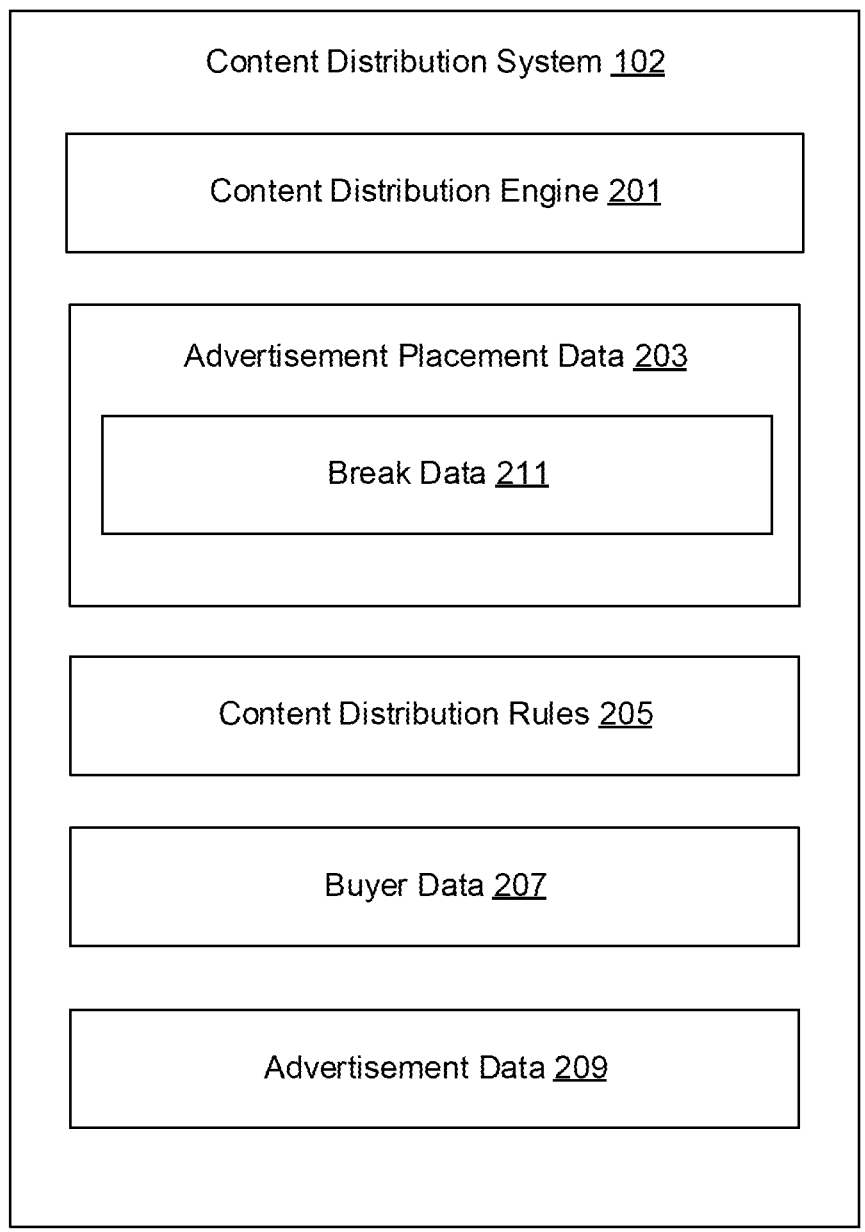
FIG. 2 is a block diagram showing sample elements of a content distribution system, according to one illustrated implementation.

FIG. 2 is a block diagram showing sample elements of a content distribution system 102, according to one illustrated implementation. The content distribution system 102 includes a content distribution engine 201, advertisement placement data 203, content distribution rules 205, buyer data 207 for one or more media content providers, advertisement data 209, and break data 211. The content distribution engine 201 analyzes incoming advertisement placement data 203 for an advertisement placement opportunity, advertisement data 209, and buyer data 207 based on the content distribution rules 205, and assigns advertisements to breaks included in the advertisement placement opportunity. The content distribution engine 201 may also use rules provided by one or more buyers with advertisements assigned to the advertisement placement opportunities to assign the advertisements to breaks. Additionally, content distribution engine 201 may obtain a score for each break that the advertisement may appear in based on the advertisements already assigned to the break.

The advertisement placement data 203 includes data related to advertisement placement opportunities, such as: various attributes of the advertisement placement opportunity, such as an identifier for the media content provider which provided the advertisement placement opportunity, the time of the advertisement placement opportunity, the number of breaks within the advertisement placement opportunity, the advertisements assigned to the advertisement placement opportunity, at least one product code for the advertisements assigned to the advertisement placement opportunity, or other attributes related to an advertisement placement opportunity. The advertisement placement data 203 includes break data 211. The break data 211 includes data related to each of the content breaks ("breaks") included within each advertisement placement opportunity. The break data 211 may include: the number of breaks in the advertisement placement opportunity, an indication of which advertisements are currently assigned to each break in the advertisement placement opportunity, or other data used to describe the breaks included in an advertisement placement opportunity. Furthermore, each break may include one or more "slots"—or "airing opportunities"—which each represent a portion of the time allotted to the break.

When an advertisement is assigned to a break, the advertisement is assigned to one or more slots included in the break. The one or more slots within a break to which the advertisement is assigned are collectively referred to as a "spot." For example, a break may be 90 seconds long with six 15-second slots. A first advertisement may be assigned to a first slot 15-second slot within the break, and thus the first slot would be referred to as a spot. A second advertisement may be assigned to a second and a third 15-second slot, thus occupying 30-seconds within the break, and the second slot and third slot may also be referred to as a spot. While the example provided uses uniform lengths of time for each slot included in a break, embodiments are not so limited, and the length of time allocated to at least one slot within a break may be shorter or longer than the length of time allocated to at least one other slot within the break. In some embodiments, the break data 211 includes a priority score for one or more spots.

The content distribution rules 205 include rules used by the content distribution system to distribute advertisement content within an advertisement placement opportunity. The content distribution rules 205 may be used to determine how many advertisements of a certain product type, company, etc., may appear in each break, how much separation there is between advertisements for similar products or services, which advertisements are excluded from being included in a break after a certain advertisement is already included in the break, etc. In some embodiments, the content distribution rules 205 are organized by using a tree data structure. In some embodiments, the content distribution rules 205 are supplemented by rules provided by a buyer of the advertisement.

The buyer data 207 includes data related to each of the buyers which have at least one advertisement assigned to an advertisement placement opportunity. The buyer data 207 may include: data regarding the type of industry the buyer operates in, data regarding rules for distribution of the buyer's content, or other data used to describe the buyer, their advertisements, or their preference regarding the placement of their advertisements.

The advertisement data 209 includes data related to each of the advertisements assigned to an advertisement placement opportunities. The advertisement data 209 may—include: data indicating the product type, service type, industry, etc., which is advertised in the advertisement; data indicating the buyer which bought the advertisement placement opportunity for the advertisement; data indicating the advertisement placement opportunity that the advertisement is assigned to; or other data related to an advertisement.

Figure 3A:
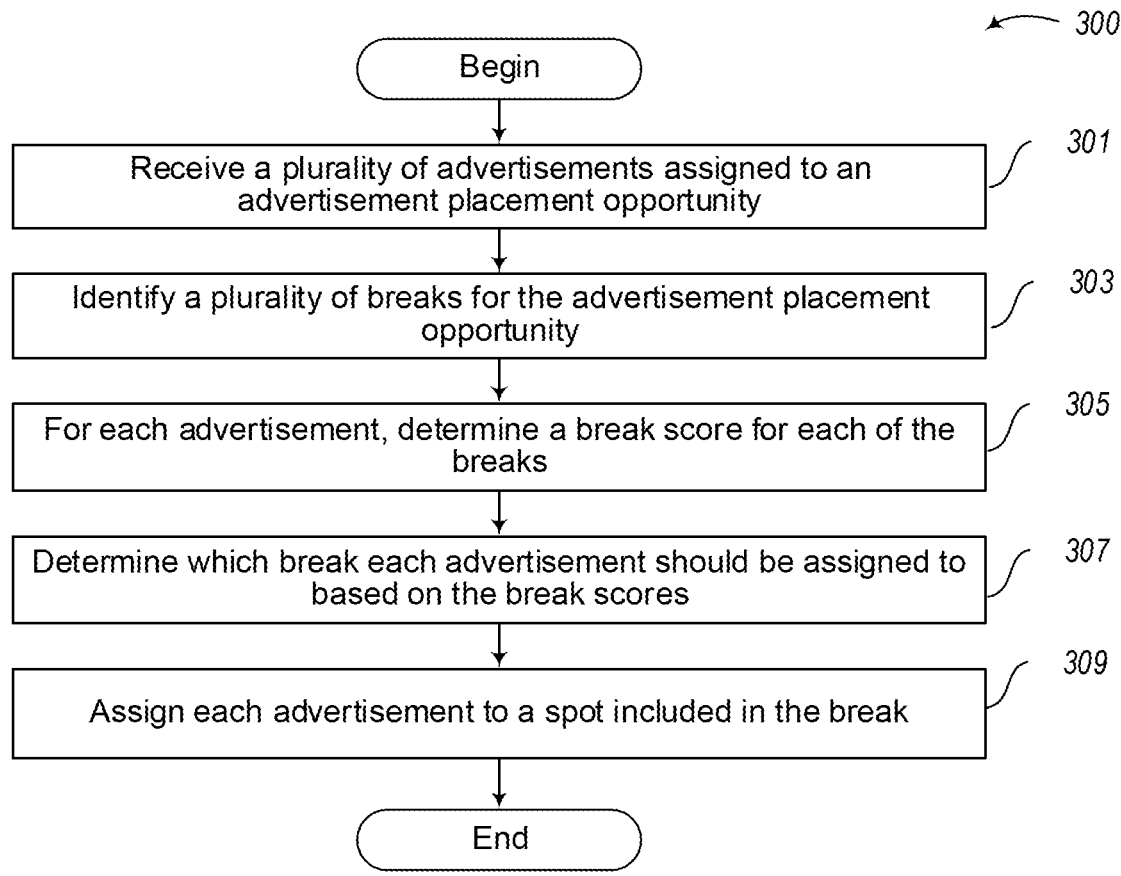
FIG. 3a is a flow diagram showing a method of operating a content distribution engine to distribute content, such as advertisements, to breaks within an advertisement placement opportunity, according to one non-limiting illustrated implementation.

FIG. 3*a* is a flow diagram showing a method 300 of operating a content distribution engine 201 to distribute content, such as advertisements, to breaks within an advertisement placement opportunity, according to one non-limiting illustrated implementation. After a start block, the method 300 begins at 301 where the content distribution engine 201 receives a plurality of advertisements assigned to an advertisement placement opportunity.

At 303, the content distributions engine 201 identifies a plurality of breaks for the advertisement placement opportunity. In some implementations, each break of the plurality of breaks includes one or more spots. In such implementations, an advertisement of the plurality of advertisements, is able to be assigned to one or more of the spots included in a break.

At 305, for each advertisement, the content distribution engine 201 determines a break score for each of the identified breaks. In some implementations, the content distribution engine 301 uses the process described in FIG. 3*b* to assign a break score to a break.

Figure 3B:
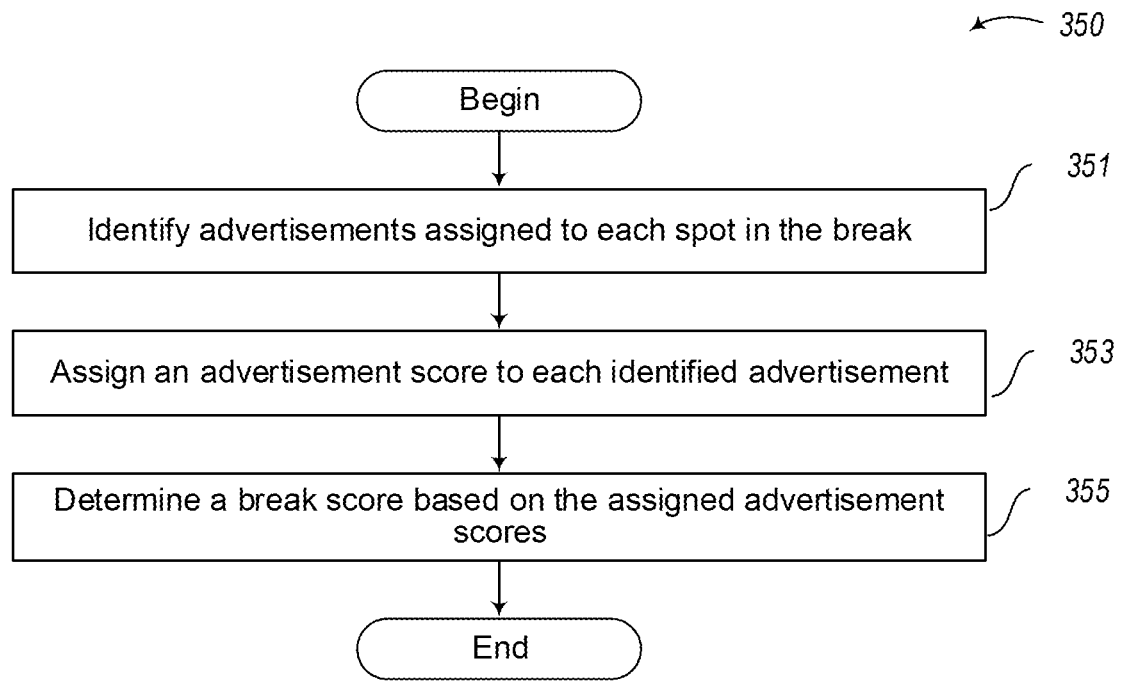
FIG. 3b is a flow diagram showing a method of operating a content distribution engine to assign a break score to a break included in an advertisement placement opportunity.

FIG. 3*b* is a flow diagram showing a method 350 of operating a content distribution engine 201 to assign a break score to a break included in an advertisement placement opportunity. After a start block, the method 350 begins at 351 where the content distribution engine identifies advertisements assigned to each spot included in the break.

At 353, the content distribution engine 201 assigns an advertisement score to each identified advertisement. In some implementations, the content distribution engine 201 assigns the advertisement score to each advertisement based on: rules or guidelines set by the media content provider, by the buyer, or by both media content provider and the buyer; and advertisement data describing the advertisement. In some implementations, the content distribution engine 201 accesses a tree data structure created based on the rules or guidelines to assign the advertisement score to an advertisement. In some implementations, the content distribution engine 201 generates the tree data structure based on the rules or guidelines.

At 355, the content distribution engine 201 determines a break score based on the assigned advertisement scores. In some implementations, the content distribution engine 201 determines the break score by aggregating the assigned advertisement scores, such as by averaging the scores, totaling the scores, or other techniques used to aggregate a plurality of scores.

After 355 the method 350 ends.

Returning to FIG. 3*a*, at 307, the content distribution engine 201 determines which break each advertisement should be assigned to based on the break scores. In some implementations, an advertisement is placed in the break which has the lowest break score.

At 309, the content distribution engine 201 assigns each advertisement to a spot included in the break that the advertisement was determined to be placed in. In some implementations, 307 and 309 are performed within 305, such that a first advertisement is assigned to a spot before the break score is determined for the next advertisement. In such implementations, a new break score is computed at least for each break that includes a spot to which the first advertisement has been assigned.

After 309, the method 300 ends.

Figure 4:
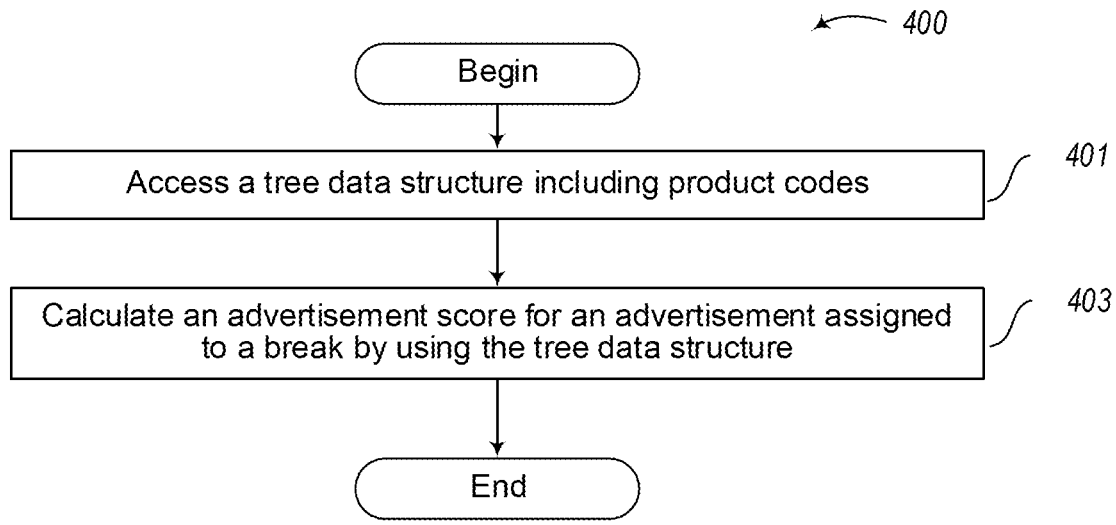
FIG. 4 is a flow diagram showing a method of operating a content distribution engine to assign an advertisement score for an advertisement pending assignment to a break by using a tree data structure.

FIG. 4 is a flow diagram showing a method 400 of operating a content distribution engine 201 to assign an advertisement score for an advertisement pending assignment to a break by using a tree data structure.

After a start block, the method 400 begins at 401, where the content distribution engine 201 accesses a tree data structure including product codes. In some implementations, the tree data structure is based on rules or guidelines for placing advertisements in breaks. In some implementations, the rules or guidelines are provided by the media content provider, one or more buyers, or a combination of the media content provider and the one or more buyers. In some implementations, the content distribution engine 201 creates the tree data structure based on the rules or guidelines. In some implementations, rules or guidelines limit the number of advertisements with certain product codes which can be assigned to a break. In some implementations, the rules or guidelines are used to assign an advertisement score to an advertisement assigned to a break.

At 403, the content distribution engine 201 calculates an advertisement score for an advertisement assigned to a break by using the tree data structure. In some implementations, the content distribution engine calculates the advertisement score based on a product code for the advertisement pending assignment to a break, a product code for the advertisement assigned to the break, and the tree data structure. In such implementations, the content distribution engine 201 may use the tree data structure to compare the advertisement pending assignment and the advertisement assigned to a break. For example, the content distribution engine may use the tree data structure to determine a measure of the similarity of the product types of the two advertisements, and assign advertisement score to the advertisement assigned to a break based on the similarity of the product types.

In some embodiments, the content distribution engine 201 calculates the advertisement score by recursively iterating through the tree data structure. For example, the content distribution engine 201 may identify a product code for an advertisement and iterate through the tree to find the product code for the advertisement. The content distribution may then use recursion to navigate through the tree and determine whether other advertisements with the same product code, or similar product codes are assigned to the break.

After 403, the method 400 ends.

Figure 5:
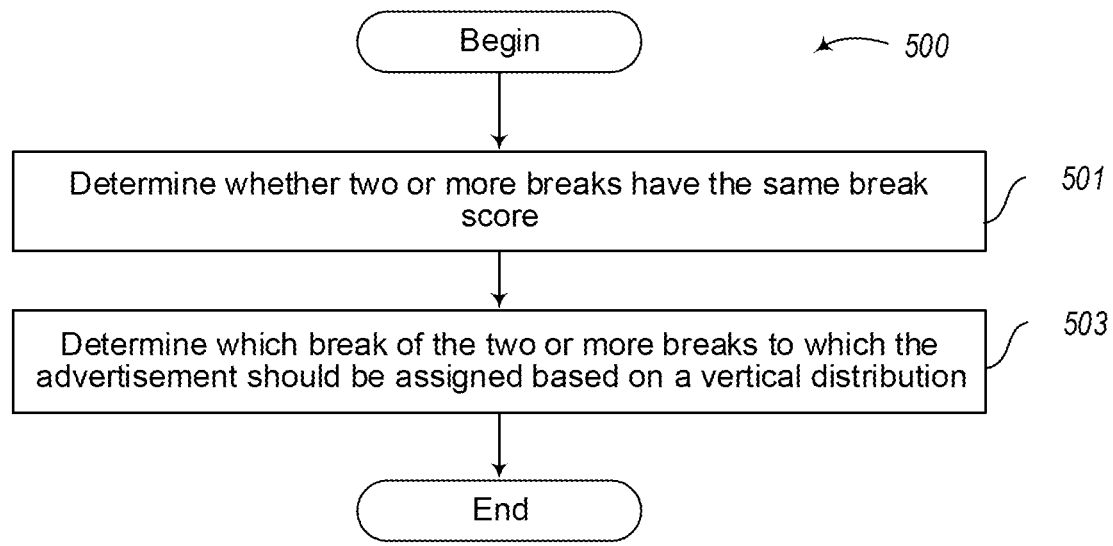
FIG. 5 is a flow diagram showing a method of operating content distribution engine to use a vertical distribution to determine the break to which an advertisement should be assigned when two or more breaks have the same break score.

FIG. 5 is a flow diagram showing a method 500 of operating content distribution engine 201 to use a vertical distribution to determine the break to which an advertisement should be assigned when two or more breaks have the same break score. The method 500 may be performed by a content distribution engine when the content distribution engine is determining which break an advertisement should be assigned, such as during the method 300 described in FIG. 3a. After a start block, the method 500 begins at 501, where the content distribution engine 201 determines whether two or more breaks have the same break score.

At 503, the content distribution engine determines which break of the two or more breaks to which the advertisement should be assigned based on a vertical distribution. In some embodiments, determining to which of the breaks the advertisement should be assigned based on the vertical distribution includes determining the time of the spot that the advertisement, or other advertisements associated with the buyer, air in relation to the time of the two or more breaks. In some embodiments, the content distribution system may check the placed advertisements for the advertiser associated with the advertisement within a predetermined time period, such as a day, a week, etc., before and after the tied breaks. Checking the placed spots may include determining the number of spots to which the advertisement is assigned in portions of the predetermined time period, such as a quarter-hour, half-hour, hour, etc. The content distribution system may then place the advertisement in the break which is least similar to the other breaks in the predetermined time period where the advertisement airs.

For example, an advertisement placement opportunity may have two breaks which occur in the same 15-minute time period which have the same break score. The content distribution engine may then determine how many times the advertisement is aired in other breaks occurring at the same time as the two breaks with the same break score on different days than the advertisement placement opportunity within a predetermined time period. For example, if the time period is four days, comparing the two breaks which air at 3:00 and 3:15 on Friday to other breaks which air at 3:00 and 3:15 on Tuesday, Wednesday, and Thursday. The predetermined time period may be any time period, and may include breaks in other advertisement placement opportunities which occur before or after the advertisement placement opportunity. The content distribution engine uses the identified breaks to determine which of the two breaks in which the advertisement should be placed. For example, the content distribution engine may determine that the advertisement has appeared in more breaks at 3:15 than in breaks at 3:00. Based on this determination, the content distribution engine may place the advertisement in the break at 3:00 for the advertisement placement opportunity. In some embodiments, the content distribution engine may determine that there are an equal number of occurrences of the advertisement, or advertisements associated with the same advertiser, placed in the breaks in other advertisement placement opportunities. For example, continuing the example above, the content distribution engine may determine that the advertisement has appeared an equal amount of times in breaks at 3:00 and 3:15, and may determine the break in which to place the advertisement by using another method.

After 503, the method 500 ends.

Figure 6:
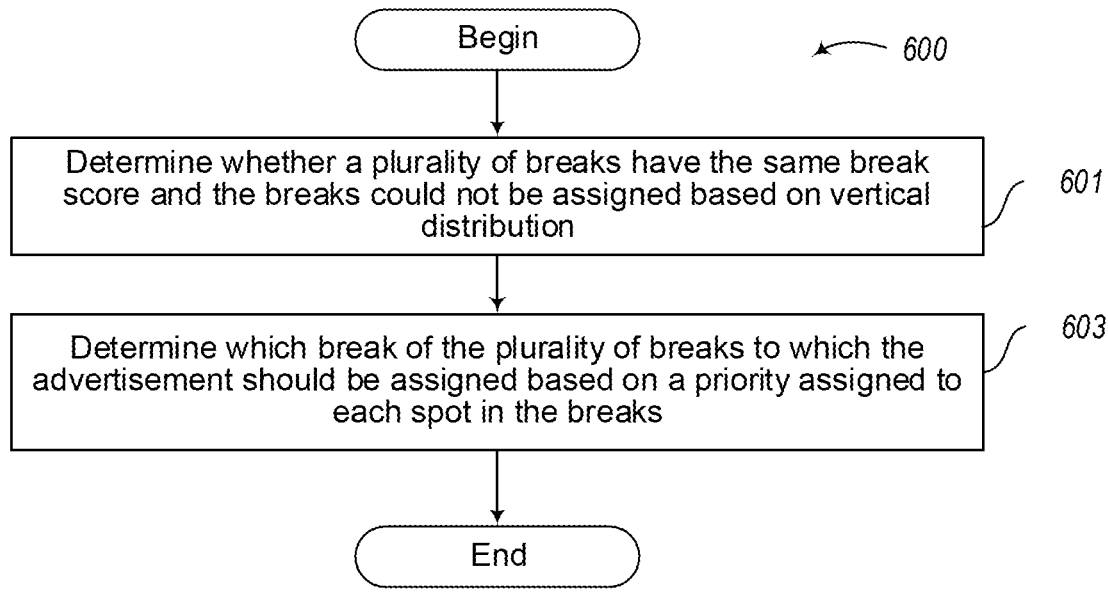
FIG. 6 is a flow diagram showing a method of operating a content distribution engine to use a priority assigned to a spot determine the break to which an advertisement should be assigned when two or more breaks have the same break score.

FIG. 6 is a flow diagram showing a method 600 of operating a content distribution engine 201 to use a priority assigned to a spot determine the break to which an advertisement should be assigned when two or more breaks have the same break score. The method 600 may be performed by a content distribution engine while the content distribution engine is determining which break an advertisement should be assigned, such as during the method 300 described in FIG. 3a. After a start block, the method 600 begins at 601, where the content distribution engine 201 determines whether a plurality of breaks have the same break score and whether the breaks could not be assigned based on a vertical distribution. In some embodiments, at 601 the content distribution engine 201 does not determine whether the advertisement could not be assigned based on a vertical distribution.

At 603, the content distribution engine 201 determines which break of the plurality of breaks to which the advertisement should be assigned based on a priority assigned to each spot included in the breaks. In some implementations, a break that occurs earlier during the media content may have spots with a higher priority than a break that occurs later in the break. In some implementations, the priority of a spot is based on when the spot occurs in the break. For example, the first spot in the second break may have a higher priority than the second spot in the first break.

Figure 7:
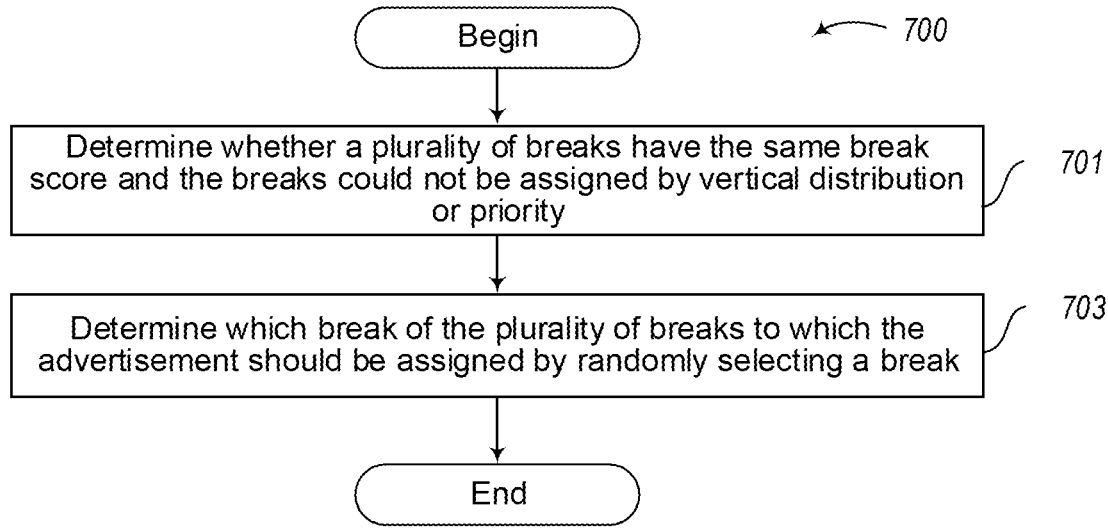
FIG. 7 is a flow diagram showing a method of operating a content distribution engine to use random selection to determine the break to which an advertisement should be assigned when two or more breaks have the same break score.

FIG. 7 is a flow diagram showing a method 700 of operating a content distribution engine 201 to use random selection to determine the break to which an advertisement should be assigned when two or more breaks have the same break score. The method 700 may be performed by a content distribution engine while the content distribution engine is determining to which break an advertisement should be assigned, such as during the method 300 described in FIG. 3a. After a start block, the method 700 begins at 701, where the content distribution engine 201 determines whether a plurality of breaks have the same break score and whether the breaks could not be assigned by vertical distribution or a priority assigned to slots. In some embodiments, at act 701, the content distribution engine 201 does not determine whether the advertisement could not be assigned by vertical distribution or a priority assigned to slots.

At 703, the content distribution engine 201 determines which break of the plurality of breaks to which the advertisement should be assigned by randomly selecting one break of the plurality of breaks.

After 703, the method 700 ends.

In some embodiments, in the event that a plurality of breaks have the same break score, the content distribution engine 201 performs methods 500, 600, and 700 sequentially until the advertisement is placed. For example, the content distribution engine 201 may first use method 500 to assign the advertisement to a break, and after a determination that the advertisement cannot be assigned based on method 500, the content distribution engine 201 executes method 600 to assign the break, etc. One of skill in the art would recognize that methods 500, 600, and 700 may be used sequentially in any order. In some embodiments, methods 500, 600, and 700 may each be used individually instead of sequentially.

Figure 8:
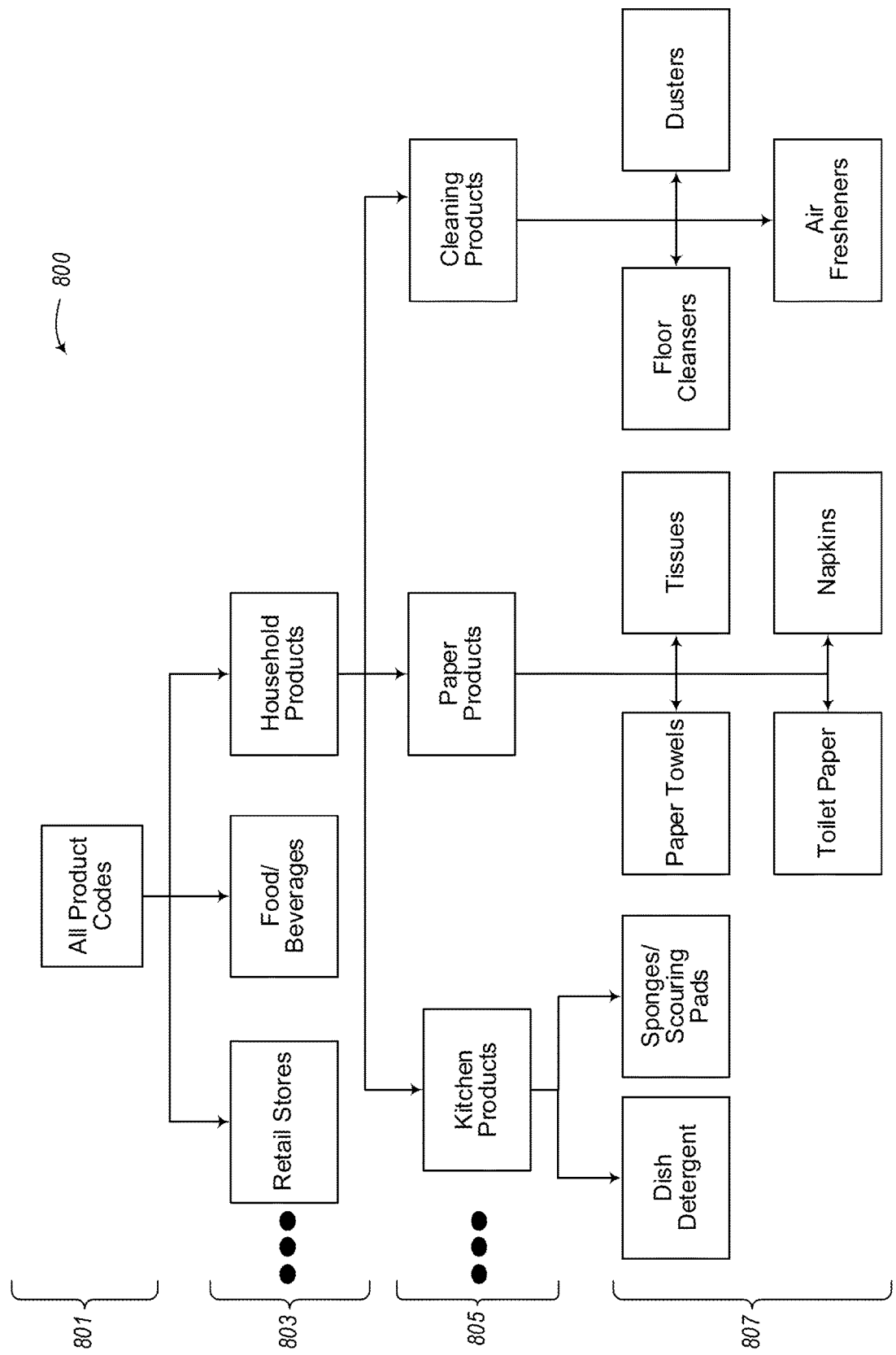
FIG. 8 is a display diagram depicting a tree data structure used by the content distribution engine to place advertisements within an advertisement placement opportunity, according to various embodiments described herein.

FIG. 8 is a display diagram depicting a tree data structure 800 used by the content distribution engine 201 to place advertisements within an advertisement placement opportunity, according to various embodiments described herein. The tree data structure 800 includes a root level 801, a first level 803, a second level 805, and a third level 807. While the tree data structure 800 depicted in FIG. 8 includes four levels, one of ordinary skill in the art would recognize that the tree data structure 800 may include as many levels as necessary to accurately differentiate product codes from one another. As a result, the tree data structure 800 may include greater than four levels, fewer than four levels, etc.

Each level in the tree data structure includes one or more nodes which are each related to at least one node in the proceeding level. Each node in the tree data structure represents one or more product codes.

The root level 801 includes the root node of the tree 800 which every product code must be related to. The first level 803 includes nodes which have product codes that relate to broad grouping of product codes. For example, the first level 803 includes nodes representing product codes such as "Retail Stores," "Food/Beverages," and "Household Products."

The second level 805 includes nodes which have product codes that narrows down the grouping of product codes from the first level 803. For example, the "Household Products" code may be divided into many types of products, such as "Kitchen Products," "Paper Products," and "Cleaning Products."

The third level 807 includes nodes which narrow down the grouping of product codes further from the second level 805. For example, "Kitchen Products" include "Dish Detergent" and "Sponges/Scouring Pads" but do not include "Tissues" and "Toilet Paper."

Thus, with each level, the tree data structure 800 includes product codes which are able to more precisely describe the product that they refer to.

In some implementations, the nodes included in the first level 803, second level 805, third level 807, etc., are referred to as parent nodes, grandparent nodes, child nodes, great-grandparent nodes, etc., based on the number of nodes which depend on the particular node. For example, in the first level 803, the "Household Products" node may be referred to as a grandparent node because there are two layers of nodes which depend on the "Household Product" node. Similarly, in the third level 807, the "Dish Detergent" node may be referred to as a child node because no nodes depend on the "Dish Detergent" node.

In some implementations, each node additionally includes the total number of products with a product code that matches the node that may appear in an advertisement placement opportunity. In such implementations, this total number of products may be changed by the content distribution system depending on an attribute of the advertisement placement opportunity, such as the number of breaks included in the advertisement placement opportunity, the length of the advertisement placement opportunity, the length of the breaks, or other attributes of the advertisement placement opportunity or breaks included in the advertisement placement opportunity.

For example, the content distribution engine may determine that for an advertisement placement opportunity with three breaks, five "Household Products" may appear within the same break. Continuing the example, the content distribution engine may determine that of the five "Household Products," two "Kitchen Products" may appear within the same break. Thus, in this example, the first break may include advertisements for five "Household Products," but only two of those five advertisements may be "Kitchen Products."

In some implementations, the content distribution engine generates the tree data structure based on one or more rules or guidelines provided to the content distribution engine. The rules or guidelines may be obtained via user input, buyer data, from a media content provider, etc. In some implementations, the content distribution engine receives user input specifying at least one new node to include in the tree data structure, and the content distribution engine alters the tree data structure to include the at least one new node.

The user input specifying at least one node may include a product code for the new node, an indication of which nodes are related to the new node, an indication of how many advertisements which include the product code specified by the node are able to be included within a break, or other attributes of a node for the tree data structure. In some implementations, the rules or guidelines used to generate the tree data structure include separation information for each product code.

FIG. 9 is a display diagram depicting an example advertisement distribution table 900 used to illustrate the how the content distribution engine places an advertisement within an advertisement placement opportunity, according to various embodiments described herein. The advertisement distribution table 900 includes advertisement information 901, a priority column 911, an advertiser column 912, a product code column 913, a first layer score column 914, a second layer score column 915, a third layer score column 916, a break score column 918, and three breaks 920-922. The advertisement information 901 includes information describing the advertisement, such as the advertiser and a product code for the advertisement.

The priority column 911 indicates the priority of each spot included in a break, such as the breaks 920-922. The advertiser column 912 indicates which advertisement has been assigned to a break. The product code column 913 indicates the product code of the advertisement assigned to a break. Each of the breaks 920-922 include information indicating which spots are filled in the break, and which slots have not yet been filled. For example, in break 920, spots 1 and 2 are filled by "Jax's Pizza" and "Joe's Drive-In," but slots 3 and "L" have not been filled yet. Thus, an advertisement can be assigned to slots 3 and "L" if the content distribution engine determines that the advertisement should be placed in the break 920.

The first layer score column 914 indicates a score for the advertisement identified in the advertiser column 912 based on the lowest layer of nodes in a tree data structure, such as the child layer of nodes. The second layer score column 915 indicates a score for the advertisement identified in the advertiser column 912 based on the layer of nodes one layer higher than the lowest layer of nodes in a tree data structure. The third layer score column 916 indicates a score for the advertisement identified in the advertiser column 912 based on the layer of nodes two layers higher than the lowest layer of nodes in a tree data structure. The break score column 918 indicates an aggregated score of each of the scores in the columns 914-916 for each of the advertisements included in the break.

In the example depicted in the advertisement distribution table 900, a content distribution engine uses tree data structure based on the following table:

---

1. All product codes (99 per break)
   a. Restaurant (3 per break)
      i. Fast Food (2 per break)
      ii. Pizza (1 per break)
      iii. Casual Dining (1 per break)

---

Thus, the tree data structure includes product codes for "Restaurant," and the "Restaurant" product code may include "Fast Food," "Pizza," and "Casual Dining." Furthermore, because the incoming advertisement is classified as "Fast Food," as seen in the advertisement information 901, the incoming advertisement may be regarded as a "Restaurant" and "Fast Food." Thus, the content distribution engine may identify conflicts based on the product codes for the incoming advertisement and the placed advertisements, by using the tree data structure to determine how similar the product for the incoming advertisement is to the placed advertisement. Furthermore, in this example the content distribution system scores the placed advertisements based on the identified similarity, such as by calculating the number of product codes shared by the placed advertisements and the advertisement to be placed.

Thus, in this example, in the first break 920 "Jax's Pizza," classified as "Pizza," receives a score of "1" in the second layer score column 915 because it shares the "Restaurant" product code with the advertisement identified in the advertisement information 901. Thus, the advertisement score for "Jax's Pizza" is 1. In contrast, "Joe's Drive-in," classified as "Fast Food," receives a score of "1" in the first layer score column 914 and in the second layer score column 915. Thus the advertisement score for "Joe's Drive-in" is 2. The content distribution engine is then able to identify "McDowells" as more similar to "Joe's Drive-in" than "Jax's Pizza."

Continuing the example, the content distribution engine aggregates the advertisement scores in each break, to receive a break score of "3" for the first break 920, a break score of "2" for the second break 921, and a break score of "1" for the third break 922. The content distribution engine compares each break score to determine the break to which the advertisement for McDowells should be assigned. In the advertisement distribution table 900, McDowells is ultimately assigned to the third break 922 (as indicated by the italicized text in column 912), because that break has the fewest conflicting product codes for McDowells, and the content distribution engine is able to identify the third break 922 as the break with the fewest advertisements similar to McDowells.

The tree data structure additionally includes information specifying limitations for how many advertisements with certain product codes are allowed in each break ("separation information"). For example, the table above specifies that only three advertisements classified as "Restaurants" may appear within each break, and of those advertisements, only two may be classified as "Fast Food," one may be classified as "Pizza," and one may be classified as "Casual Dining." Continuing the example, if another advertisement classified as a "Restaurant" had been placed in the second break 921, the "McDowells" advertisement would not be able to be placed in the second break 921, even if that break had the lowest break score out of the three breaks.

FIG. 10 is a display diagram depicting an advertisement distribution table 1000, used to illustrate the how the content distribution engine places an advertisement within an advertisement placement opportunity, according to various embodiments described herein. The advertisement table 1000 is similar to the advertisement distribution table 900. In the example depicted in the advertisement distribution table 1000, a content distribution engine uses tree data structure based on the following table:

---

1. All product codes (99 per break)
   a. Beverages (4 per break)
     i. Alcohol (3 per break)
       1. Domestic Beer (1 per break)
       2. Foreign Beer (1 per break)
       3. Wine (2 per break)
     ii. Cold Beverage (2 per break)
       1. Energy Drinks (1 per break)
       2. Juice/Tea (1 per break)
       3. Soda (1 per break)

---

-continued

--- iii. Waters (1 per break)
     iv. Hot Beverages (1 per break)

---

In the example shown in the advertisement distribution table 1000, the advertisement to be placed is classified as "Wine," as seen in the advertisement information 1001. Thus, even though the first break 1020 only includes one advertisement, it receives a score of "3," because the advertisement to be placed is classified as "Wine" and the advertisement already placed in the first break 1020 is classified as a "Wine." Additionally, although the advertisements in the second break 1021 only share the "Beverage" product code with the advertisement to be placed, the second break 1021 receives a break score of "3" because there are three advertisements in the second break 1021 which are classified as "Beverages." Thus, the advertisement is placed in the third break 1022.

FIG. 11 is a display diagram depicting an advertisement distribution table 1100, used to illustrate the how the content distribution engine places an advertisement within an advertisement placement opportunity, according to various embodiments described herein. The advertisement table 1100 is similar to the advertisement distribution table 900. In the example depicted in the advertisement distribution table 1100, a content distribution engine uses tree data structure used in the example depicted in the advertisement distribution table 1000.

In the example shown in the advertisement distribution table 1100, the advertisement to be placed is classified as a "Domestic Beer" and the content distribution engine has calculated a break score of "3" for the first break 1120, and a break score of "2" for the second break 1121 and third break 1122. Thus, the advertisement to be placed may be placed in either the second break 1121 or the third break 1122. The content distribution engine is able to resolve the placement of the advertisement by using a process similar to those described in FIGS. 5-7, or another process to determine the break to which the advertisement should be assigned when a plurality of breaks have the same break score.

FIG. 12 is a display diagram depicting an advertisement distribution table 1200, used to illustrate the how the content distribution engine places an advertisement within an advertisement placement opportunity, according to various embodiments described herein. The advertisement table 1200 is similar to the advertisement distribution table 900. In the example depicted in the advertisement distribution table 1200, a content distribution engine uses tree data structure based on the following table:

---

1. All product codes (unlimited)
   a. Household Products (unlimited)
     i. Kitchen (2 per break)
       1. Dish Detergent (1 per break)
       2. Sponges/Scouring Pads (1 per break)
     ii. Paper Products (3 per break)
       1. Paper Towels (1 per break)
       2. Toilet Paper (1 per break)
       3. Tissues (1 per break)
       4. Napkins (1 per break)
     iii. Cleaning Products (2 per break)
       1. Floor Cleaners (1 per break)
       2. Air Fresheners (1 per break)
       3. Dusters (1 per break)

In the example shown in the advertisement distribution table 1200, the advertisement to be placed is classified as "Paper Towels," as seen in the advertisement information 1201. Furthermore, as seen in the table above, there is an unlimited number of "Household Products" allowed per break. Thus, the third layer score column 1216 has no value when placing a "Household Product." As a result, even though the "Facial Tissues" advertisement is classified as "Tissues," it only contributes a score of "1" to the break score for the first break 1220. Likewise, because "Sweepers" is classified as a duster, there is no conflict between the advertisement to be placed and "Sweepers" at the second level of the tree. Therefore, "Sweepers" does not contribute any score to the break score for the first break 1220. As a result, in this example, the advertisement to be placed can be placed in either the first break 1220 or the second break 1221.

FIG. 13 is a display diagram depicting an advertisement distribution table 1300, used to illustrate the how the content distribution engine places an advertisement within an advertisement placement opportunity, according to various embodiments described herein. The advertisement table 1300 is similar to the advertisement distribution table 900. In the example depicted in the advertisement distribution table 1300, a content distribution engine uses tree data structure based on the following table:

---
1. All product codes (unlimited)
   a. Retail (10 per break)
      i. Home Stores (unlimited)
         1. Lawn/Garden Centers (2 per break)
         2. Hardware/Lumber (2 per break)
         3. Furniture (1 per break)
         4. Bath and Kitchen (1 per break)
         5. Appliances (1 per break)
      ii. Clothing Stores (2 per break)
         1. Men's Apparel (1 per break)
         2. Women's Apparel (1 per break)
         3. Children's clothes (1 per break)
         4. Shoes (1 per break)
---

In the example shown in the advertisement distribution table 1300, the advertisement to be placed is classified as "Hardware/Lumber," as seen in the advertisement information 1301. Furthermore, as seen in the table above, there is an unlimited number of "Home Stores" allowed per break, even though there are only ten advertisements with a "Retail" product code allowed per break. Thus, the second layer score column 1315 has no value when the product code of an advertisement that has been placed is included in the "Home Stores" product code. As a result, even though the "Wally's Garden" advertisement is classified as "Lawn/Garden," it does not contribute to the break score for the first break 1320. Likewise, because the "Hughes" advertisement is classified as "Hardware/Lumber," which is a product code match at the first layer, it contributes "1" to the break score for the first break 1320.

Additionally, even though advertisements classified as "Home Stores" do not contribute to the break score in the second layer score column 1315, advertisements classified as "Clothing Stores" continue to contribute in the third layer score column 1316. For example, the "Clothier's" advertisement is classified as "Women's Apparel" and contributes "1" to the total break score for the first break 1320 in the third layer score column 1316. Thus, in this example, the advertisement to be placed can be placed in the second break 1321.

FIG. 14 is a display diagram depicting an advertisement distribution table 1400, used to illustrate the how the content distribution engine places an advertisement with multiple product codes within an advertisement placement opportunity, according to various embodiments described herein. The advertisement table 1400 is similar to the advertisement distribution table 900. However, the advertisement table 1400 includes a second set of layer score columns 1414b-1416b, which correspond to a second product code for the advertisement to be placed. In the example depicted in the advertisement distribution table 1400, a content distribution engine uses tree data structure based on the table used for the advertisement table 1000.

In the example shown in the advertisement distribution table 1400, the advertisement to be placed is classified as "Soda" and "Energy Drinks," as seen in the advertisement information 1401. Thus, the advertisement has two classifications which affect the placement of the advertisement. For example, the advertisement for "Bespi" is also classified as both "Soda" and "Energy Drinks." Thus, for the first set of layer score columns 1414a-1416a, which correspond to the "Soda" product code, the first layer score column 1414a has a score of "1" because both advertisements are classified as a "Soda." However, the second layer score column 1415a and third layer score column 1416a each include two scores because both advertisements are classified as a "Soda" and "Energy Drinks." Thus, there is product score match for the "Soda" classification and the "Energy Drinks" classification, because both "Soda" and "Energy Drinks" are included in the "Cold Beverage" and "Hot Beverage" product codes.

The second set of layer score columns 1414b-1416b correspond to the "Energy Drinks" product code. Thus, the first layer score column 1414b has a score of "1" because both advertisements are classified as "Energy Drinks," and the second layer score column 1415b and third layer score column 1416b each include two scores. As a result, in this example, the "Bespi" advertisement contributes ten points to the break score for the first break 1420.

Figure 15:
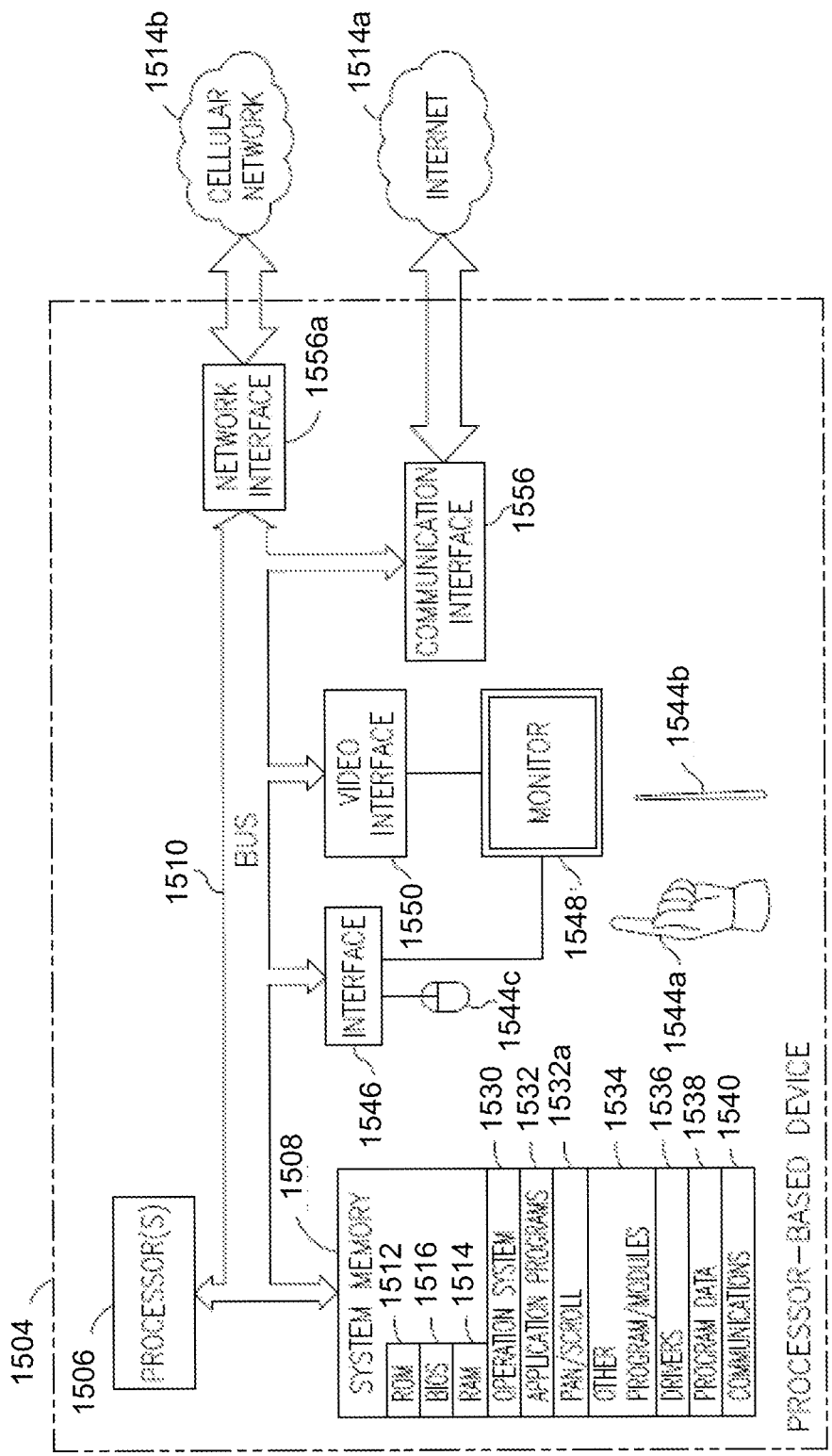
FIG. 15 shows a processor-based device suitable for implementing the various functionality described herein.

FIG. 15 shows a processor-based device 1504 suitable for implementing the various functionality described herein. Although not required, some portion of the implementations will be described in the general context of processor-executable instructions or logic, such as program application modules, objects, or macros being executed by one or more processors. Those skilled in the relevant art will appreciate that the described implementations, as well as other implementations, can be practiced with various processor-based system configurations, including handheld devices, such as smartphones and tablet computers, wearable devices, multiprocessor systems, microprocessor-based or programmable consumer electronics, personal computers ("PCs"), network PCs, minicomputers, mainframe computers, and the like.

The processor-based device 1504 may include one or more processors 1506, a system memory 1508 and a system bus 1510 that couples various system components including the system memory 1508 to the processor(s) 1506. The processor-based device 1504 will at times be referred to in the singular herein, but this is not intended to limit the implementations to a single system, since in certain implementations, there will be more than one system or other networked computing device involved. Non-limiting examples of commercially available systems include, but are not limited to, ARM processors from a variety of manufactures, Core microprocessors from Intel Corporation, U.S.A., PowerPC microprocessor from IBM, Sparc microprocessors from Sun Microsystems, Inc., PA-RISC series microprocessors from Hewlett-Packard Company, 68xxx series microprocessors from Motorola Corporation.

The processor(s) 1506 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 15 are of conventional design. As a result, such blocks need not be described in further detail herein, as they will be understood by those skilled in the relevant art.

The system bus 1510 can employ any known bus structures or architectures, including a memory bus with memory controller, a peripheral bus, and a local bus. The system memory 1508 includes read-only memory ("ROM") 1512 and random access memory ("RAM") 1514. A basic input/output system ("BIOS") 1516, which can form part of the ROM 1512, contains basic routines that help transfer information between elements within processor-based device 1504, such as during start-up. Some implementations may employ separate buses for data, instructions and power.

The processor-based device 1504 may also include one or more solid state memories, for instance Flash memory or solid state drive (SSD) 1518, which provides nonvolatile storage of computer-readable instructions, data structures, program modules and other data for the processor-based device 1504. Although not depicted, the processor-based device 1504 can employ other nontransitory computer- or processor-readable media, for example a hard disk drive, an optical disk drive, or memory card media drive.

Program modules can be stored in the system memory 1508, such as an operating system 1530, one or more application programs 1532, other programs or modules 1534, drivers 1536 and program data 1538.

The application programs 1532 may, for example, include panning/scrolling 1532a. Such panning/scrolling logic may include, but is not limited to logic that determines when and/or where a pointer (e.g., finger, stylus, cursor) enters a user interface element that includes a region having a central portion and at least one margin. Such panning/scrolling logic may include, but is not limited to logic that determines a direction and a rate at which at least one element of the user interface element should appear to move, and causes updating of a display to cause the at least one element to appear to move in the determined direction at the determined rate. The panning/scrolling logic 1532a may, for example, be stored as one or more executable instructions. The panning/scrolling logic 1532a may include processor and/or machine executable logic or instructions to generate user interface objects using data that characterizes movement of a pointer, for example data from a touch-sensitive display or from a computer mouse or trackball, or other user interface device.

The system memory 1508 may also include communications programs 1540, for example a server and/or a Web client or browser for permitting the processor-based device 1504 to access and exchange data with other systems such as user computing systems, Web sites on the Internet, corporate intranets, or other networks as described below. The communications programs 1540 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers and/or Web clients or browsers are commercially available such as those from Mozilla Corporation of California and Microsoft of Washington.

While shown in FIG. 15 as being stored in the system memory 1508, the operating system 1530, application programs 1532, other programs/modules 1534, drivers 1536, program data 1538 and server and/or communications programs 1540 can be stored on any other of a large variety of nontransitory processor-readable media (e.g., hard disk drive, optical disk drive, SSD and/or flash memory).

A user can enter commands and information via a pointer, for example through input devices such as a touch screen 1548 via a finger 1544a, stylus 1544b, or via a computer mouse or trackball 1544c which controls a cursor. Other input devices can include a microphone, joystick, game pad, tablet, scanner, biometric scanning device, etc. These and other input devices (i.e., "I/O devices") are connected to the processor(s) 1506 through an interface 1546 such as touch-screen controller and/or a universal serial bus ("USB") interface that couples user input to the system bus 1510, although other interfaces such as a parallel port, a game port or a wireless interface or a serial port may be used. The touch screen 1548 can be coupled to the system bus 1510 via a video interface 1550, such as a video adapter to receive image data or image information for display via the touch screen 1548. Although not shown, the processor-based device 1504 can include other output devices, such as speakers, vibrator, haptic actuator, etc.

The processor-based device 1504 may operate in a networked environment using one or more of the logical connections to communicate with one or more remote computers, servers and/or devices via one or more communications channels, for example, one or more networks 1514a, 1514b. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, the processor-based device 1504 may include one or more wired or wireless communications interfaces 1514a, 1514b (e.g., cellular radios, WI-FI radios, Bluetooth radios) for establishing communications over the network, for instance the Internet or cellular network.

In a networked environment, program modules, application programs, or data, or portions thereof, can be stored in a server computing system (not shown). Those skilled in the relevant art will recognize that the network connections shown in FIG. 15 are only some examples of ways of establishing communications between computers, and other connections may be used, including wirelessly.

For convenience, the processor(s) 1506, system memory 1508, network and communications interfaces 1514a, 1514b are illustrated as communicably coupled to each other via the system bus 1510, thereby providing connectivity between the above-described components. In alternative implementations of the processor-based device 1504, the above-described components may be communicably coupled in a different manner than illustrated in FIG. 15. For example, one or more of the above-described components may be directly coupled to other components, or may be coupled to each other, via intermediary components (not shown). In some implementations, system bus 1510 is omitted and the components are coupled directly to each other using suitable connections.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a computer system, comprising:
receiving a plurality of advertisements assigned to an advertisement placement opportunity, each advertisement including advertisement information;
identifying a plurality of breaks for the advertisement placement opportunity, each break including a plurality of spots; and
for each respective advertisement of the plurality of advertisements assigned to the advertisement placement opportunity:
determining a break score for each break, comprising:
identifying advertisements assigned to spots included in the break;
assigning an advertisement score to each of the identified advertisements based on the advertisement information for the respective advertisement and the advertisement information for the each of the identified advertisements; and
determining the break score based on the assigned advertisement scores for each of the identified advertisements;
determining which break of the plurality of breaks the respective advertisement should be assigned to based on the determined break scores; and
assigning the respective advertisement to one spot of the plurality of spots included in the determined break.

2. The method of claim 1, wherein the advertisement information includes at least one product code for the advertisement.

3. The method of claim 1, wherein determining which break the respective advertisement should be assigned to further comprises:
determining whether two or more breaks of the plurality of breaks have the same break score; and
responsive to determining that two or more breaks have the same break score, determining which of the two or more breaks the respective advertisement should be assigned to based on a vertical distribution of the spots included in the two or more breaks.

4. The method of claim 1, wherein determining which break the respective advertisement should be assigned to further comprises:
determining whether a plurality of breaks have the same break score; and
determining which break the respective advertisement should be assigned to based on a priority assigned to each slot included in the plurality of breaks.

5. The method of claim 1, wherein determining which break the respective advertisement should be assigned to further comprises:
determining whether a plurality of breaks have the same break score; and
determining which break the respective advertisement should be assigned to by randomly selecting one break of the plurality of breaks.

6. The method of claim 1, wherein determining which break the respective advertisement should be assigned to further comprises:
determining whether a plurality of breaks have the same break score;
determining whether the respective advertisement can be assigned to a break based on a vertical distribution;
based on a determination that the respective advertisement can be assigned to a break based on a vertical distribution, assigning the respective advertisement to a break based on a vertical distribution;
based on a determination that the respective advertisement cannot be assigned to a break based on a vertical distribution, determining whether the respective advertisement can be assigned to a break based on a priority assigned to each slot included in the plurality of breaks;
based on a determination that the respective advertisement can be assigned to a break based on a priority assigned to each slot included in the plurality of breaks, assigning the respective advertisement to a break based on a priority assigned to each slot included in the plurality of breaks; and based on a determination that the respective advertisement cannot be assigned to a break based on a priority assigned to each slot included in the plurality of breaks, assigning the respective advertisement to a random break of the plurality of breaks.

7. The method of claim 2, wherein assigning the advertisement score to the identified advertisement comprises assigning the advertisement score by using the product code in the advertisement information for the respective advertisement and the product code in the advertisement information for the identified advertisement.

8. The method of claim 2, wherein determining the break score further comprises:
   accessing a tree data structure which includes at least one product code at each node; and
   assigning the advertisement score to the identified advertisement based on the tree data structure, the advertisement information for the respective advertisement, and the advertisement information for the identified advertisement.

9. The method of claim 2, wherein determining which break the respective advertisement should be assigned to further comprises:
   receiving separation information indicating a maximum number of advertisements with a certain product code that are permitted to be assigned to each break; and
   determining which break the respective advertisement should be assigned to based on the determined break scores and the separation information.

10. The method of claim 8, further comprising:
    receiving user input specifying at least one product code to include in the tree data structure.

11. The method of claim 9, wherein the separation information is included in a tree data structure which includes at least one product code at each node, and wherein assigning the advertisement score further comprises:
    assigning the advertisement score to the identified advertisement based on the tree data structure, the advertisement information for the respective advertisement, and the advertisement information for the identified advertisement.

12. The method of claim 11, wherein assigning the advertisement score further comprises:
    recursively navigating through the tree data structure to determine a level of similarity between the respective advertisement and the identified advertisement.

13. A system to optimize placement of advertisement spots, the system comprising:
    at least one nontransitory processor-readable storage medium that stores at least one of instructions or data; and
    at least one processor communicatively coupled to the at least one nontransitory processor-readable storage medium, wherein the instructions or data cause the at least one processor to:
      receive a plurality of advertisements assigned to an advertisement placement opportunity, each advertisement including advertisement information;
      receive a plurality of breaks for the advertisement placement opportunity, each break including a plurality of spots; and
      for each respective advertisement of the plurality of advertisements assigned to the advertisement placement opportunity:
        determine a break score for each break, comprising:
          identify advertisements assigned to spots included in the break;
          assign an advertisement score to each of the identified advertisements based on the advertisement information for the respective advertisement and the advertisement information for the each of the identified advertisements; and
          determine the break score based on the assigned advertisement scores for each of the identified advertisements;
        determine which break of the plurality of breaks the respective advertisement should be assigned to based on the determined break scores; and
        assign the respective advertisement to one spot of the plurality of spots included in the determined break.

14. The system of claim 13, wherein the advertisement information includes at least one product code for the advertisement.

15. The system of claim 13, wherein causing the at least one processor to determine which break the respective advertisement should be assigned to further comprises causing the at least one processor to:
    determine whether two or more breaks of the plurality of breaks have the same break score; and
    responsive to determining that two or more breaks have the same break score, determine which of the two or more breaks the respective advertisement should be assigned to based on a vertical distribution of the spots included in the two or more breaks.

16. The system of claim 13, wherein causing the at least one processor to determine which break the respective advertisement should be assigned to further comprises causing the at least one processor to:
    determine whether a plurality of breaks have the same break score; and
    determine which break the respective advertisement should be assigned to based on a priority assigned to each spot included in the plurality of breaks.

17. The system of claim 13, wherein causing the at least one processor to determine which break the respective advertisement should be assigned to further comprises causing the at least one processor to:
    determine whether a plurality of breaks have the same break score; and
    determine which break the respective advertisement should be assigned to by randomly selecting one break of the plurality of breaks.

18. The system of claim 14, wherein causing the at least one processor to assign the advertisement score to the identified advertisement further comprises causing the at least one processor to assign the advertisement score based on the product code in the advertisement information for the respective advertisement and the product code in the advertisement information for the identified advertisement.

19. The system of claim 14, wherein causing the at least one processor to determine the break score further comprises causing the at least one processor to:
    access a tree data structure which includes at least one product code at each node; and
    assign the advertisement score to the identified advertisement based on the tree data structure, the advertisement information for the respective advertisement, and the advertisement information for the identified advertisement.

20. The system of claim 14, wherein causing the at least one processor to determine which break the respective advertisement should be assigned to further comprises causing the at least one processor to:
   receive separation information indicating a maximum number of advertisements with a certain product code that are permitted to be assigned to each break; and
   determine which break the respective advertisement should be assigned to based on the determined break scores and the separation information.

21. The system of claim 19, wherein the at least one processor is further caused to:
   receive user input specifying at least one product code to include in the tree data structure.

22. A nontransitory processor-readable storage medium that stores at least one of instructions or data, the instructions or data, when executed by at least one processor, cause the at least one processor to:
   receive a plurality of advertisements assigned to an advertisement placement opportunity, each advertisement including advertisement information;
   receive a plurality of breaks for the advertisement placement opportunity, each break including a plurality of spots; and
   for each respective advertisement of the plurality of advertisements assigned to the advertisement placement opportunity:
      determine a break score for each break, comprising:
         identity advertisements assigned to spots included in the break;
         assign an advertisement score to each of the identified advertisements based on the advertisement information for the respective advertisement and the advertisement information for the each of the identified advertisements; and
         determine the break score based on the assigned advertisement scores for each of the identified advertisements;
      determine which break of the plurality of breaks the respective advertisement should be assigned to based on the determined break scores; and
      assign the respective advertisement to one spot of the plurality of spots included in the determined break.

* * * * *